April 7, 1942.   A. S. NORCROSS   2,278,622
ALTERNATING CURRENT COMMUTATOR MOTOR
Filed Feb. 1, 1941

INVENTOR
Austin S. Norcross
BY
Thomas A. Jenkins
ATTORNEY

Patented Apr. 7, 1942

2,278,622

UNITED STATES PATENT OFFICE 2,278,622

ALTERNATING CURRENT COMMUTATOR MOTOR

Austin S. Norcross, Waban, Mass.

Application February 1, 1941, Serial No. 377,021

6 Claims. (Cl. 172—276)

My invention relates to improvements in the novel types of alternating current commutator single phase motors shown in my prior Patents #2,060,106, Alternating current motor, November 10, 1936, #2,192,050, Alternating current commutator motor, February 27, 1940, and #2,192,051, Constant speed motor, February 27, 1940. As stated in said Patents #2,192,050 and #2,192,051, I preferably construct such a motor as to satisfy the equations mentioned on page 3 of said Patent #2,192,050 and in certain of the claims thereof. I have discovered that a motor sufficiently accurate for most practical purposes can be designed which may be regulated through a single adjustable power transmission means, taking advantage of the fact that $\phi_M$ and $V_A$ mentioned in said formulas generally vary inversely, and visualizing the fact that $\phi_Q$ could be maintained constant and $\phi_M$ and $V_A$ conjointly inversely varied by a single transmitting means to supply the desired output characteristics at super synchronous speeds.

An object of my invention, therefore, is to provide such a motor having the desirable shunt speed characteristics having a single adjustable regulating element such as a rider or the movable element of a switch which may conjointly inversely vary $\phi_M$ and $V_A$ for different speeds. Employing this single movable regulating means, it is obvious that such a desirable type of motor and its voltage regulator may be designed and constructed of a smaller number of standard parts employing standard regulator elements.

A further object of my invention is to provide such an alternating current commutator motor which may be alternately provided with an adjustment for running said motor at sub synchronous speeds, specifically desirable for use in starting the motor for use at super synchronous speeds, and my invention specifically relates to alternative means which may be employed for accomplishing this purpose, employing adjustable armature voltages of reversed phase only for such sub synchronous speeds, and which thus may be readily regulated to operate at super synchronous speeds with the desirable shunt and other characteristics of the motors described in said former patents.

Further features of my invention relate to improvements in the various simplified structures for carrying out the above features.

These and such other objects of my invention as may hereinafter appear will be best understood from a description of the accompanying drawing which illustrates various embodiments thereof.

In the drawing, Fig. 1 is a circuit diagram of a single phase adjustable speed motor of the type described in Fig. 1 of my former Patent #2,192,050, modified in accordance with my present invention so that the device may operate at super synchronous speeds with the desired shunt characteristics, and selectively alternatively operated at sub synchronous speeds, with the device set for operation at super synchronous speeds.

Figure 1:
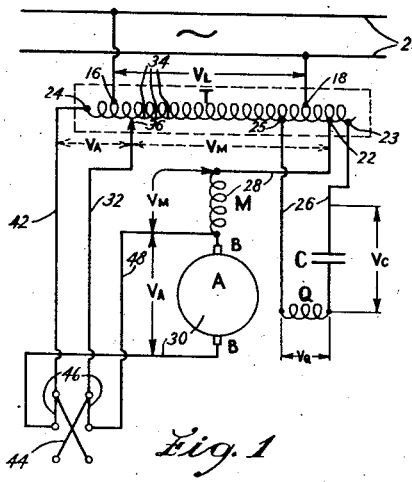

In the drawing, wherein like characters of reference generally indicate like parts throughout, I have shown various embodiments of single phase motors constructed in accordance with the principles of my invention. The different embodiments of single phase alternating current motors shown are in most respects modifications of the single phase motor described and claimed in my former Patent #2,060,106, and particularly the single phase motors shown in Figs. 1 and 2 of my former Patent #2,192,050, only employing a simplified regulating means and a supplemental means for regulating the motor at sub synchronous speeds. In general, the embodiments of my invention shown herein, are constructed to operate in similar fashion to the embodiments shown in said patents, and if a fuller description of the theory of such a type of motor be desired than set forth herein, including the equations and formulae involved, reference is hereby made to said patents.

Figure 2:
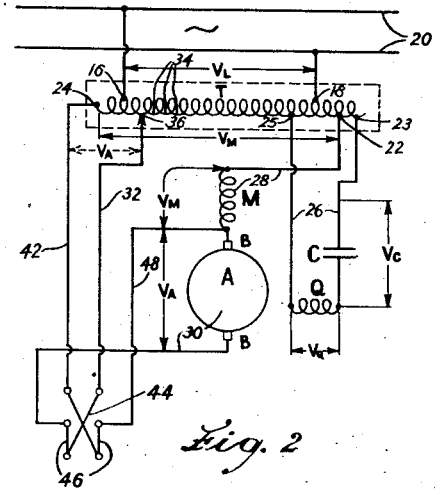
Fig. 2 is a circuit diagram of the motor shown in Fig. 1 with the device set for operation at sub synchronous speeds.
Figure 3:
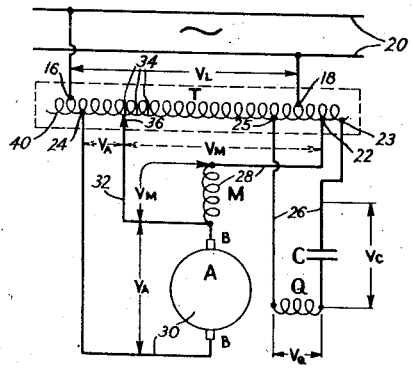
Fig. 3 is an alternative embodiment of my invention employing an alternative type of means for operating at sub synchronous speeds and employing a single adjustable rider for use at both sub synchronous and super synchronous speeds.

As in the embodiment shown in Figs. 1 and 2 of said Patent #2,192,050, and in all of my embodiments shown herein, I employ a main line 20 connected to two fixed points on the transformer T, such as the points 16 and 18 shown herein. The alternating current motor per se is of similar type to the motors shown in said patents and comprises a main winding M, a rotor having a coiled commutator armature winding A, brushes B placed substantially along the axis of said main winding, a quadrature winding Q spaced ninety electrical degrees from the main winding, and means for dephasing the current in the quadrature winding, in the preferred embodiment shown comprising a capacitator C. The transformer T includes magnetic core means and winding means wound around said core means connected to the main line 20 at the points 16 and 18. In all embodiments shown I employ a circuit 26 for said quadrature winding Q and dephasing means comprising the capacitator C, connected to two fixed points 23 and 25 on said magnetic core winding means. I also employ a circuit 28 for said main winding M connected to a fixed point 22 on said magnetic core winding means. I also employ a circuit 30 for said armature winding A, also connected to a fixed point 24 on said magnetic core winding means spaced from the fixed point 22 at which the main circuit 28 is connected to said magnetic core winding means. For convenience, it is obvious that two or more of the following: a main line portion 20, the quadrature winding circuit 26, the main winding circuit 28 or the armature winding circuit 30, may be connected to the magnetic core winding means through a common point if desired, to simplify the motor. As stated hitherto, my invention is based on the same theory of operation as fully described on page 3 of my Patent No. 2,192,050, to function as stated therein, as follows:

"The speed of this motor may be adjusted by controlling $\phi_M$ and $\phi_Q$ as described in the above-mentioned patent, or by controlling the voltage $V_A$ impressed upon the brushes. The voltage $V_A$ is substantially in phase with $E_{MT}$ above synchronous speed and in phase opposition to it below synchronous speed. It will be observed by referring to Fig. 3 of the above-mentioned Patent No. 2,060,106 that adding a voltage $V_A$ in phase with $E_{MT}$ will result in an increase in $E_{QS}$ and a corresponding increase in speed. Similarly adding a voltage $V_A$ in phase opposition to $E_{MT}$ will decrease $E_{QS}$ and the speed. Inasmuch as $V_M$ and $V_Q$ vary in proportion to $\phi_M$ and $\phi_Q$, the speed of this motor may therefore be adjusted by controlling any one or all three of the variables $V_M$, $V_Q$ and $V_A$, and may be approximately expressed by the following algebraic equation:

$$N = \frac{-I_a Z + K\phi_M f \pm V_A}{K\phi_Q} \quad (1)$$

where Z is the impedance of the armature cir-circuit, $I_a$ equals the armature current. This expression assumes that $E_{QS}$ is in phase opposition to $E_{MT}$ which is substantially the case as $E_{QS}$ is only slightly displaced from this position to improve the performance of the motor.

Figure 4:
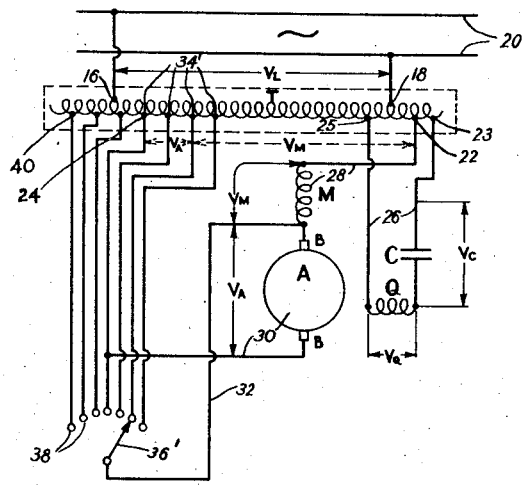
Fig. 4 is a diagram of a further embodiment of my invention identical to that shown in Fig. 3, with the exception that a single multi-contact switch is employed for varying the adjustments instead of a movable rider.

"The resultant voltage induced into the coil undergoing commutation must be small to prevent brush sparking and excessive losses due to circulating currents. This resultant voltage is made up of a transformer voltage $e_t$ which is produced by the quadrature field flux and a speed voltage $e_s$ which is produced by the main field flux. In the case of the single-phase motor referred to, these two component voltages are substantially in phase opposition to each other as shown by Fig. 4 so that the best commutation is obtained when $$e_t = e_s \quad (2)$$

where $e_t = K\phi_Q f$ and $e_s = K\phi_M n$."

For convenience, I append a list of the symbols used in this specification in referring to the various electric forces considered.

$\phi_M$ = main field flux
$\phi_Q$ = quadrature field flux
$V_A$ = voltage impressed upon brushes
$E_{MT}$ = transformer voltage induced into armature from main field flux
$E_{QS}$ = speed voltage generated in armature from quadrature field voltage
$V_Q$ = quadrature field voltage
$V_M$ = main field voltage
$N$ = speed
$I_a$ = armature current
$Z$ = impedance of armature circuit
$f$ = frequency
$e_t$ = transformer voltage induced into coil undergoing commutation
$e_s$ = speed voltage generated in coil undergoing commutation
$n$ = speed multiplied by number of pairs of poles
$K$ = constant In the voltage regulator shown in said prior Patent No. 2,192,050, $\phi_M$, $V_A$ and $\phi_Q$ were all suitably varied by voltage regulators. I have discovered, however, that, in general, to continuously satisfy said formulae at super synchronous speeds $\phi_M$ should vary inversely to $V_A$ and that a sufficiently satisfactory motor could be made having substantially the same desirable output characteristics by making $\phi_Q$ constant and by varying $\phi_M$ and $V_A$ inversely to each other at super synchronous speed, and that taking advantage of this fact, $\phi_M$ and $V_A$ could be inversely varied through a single power transmitting means. I have shown in Figs. 1, 3 and 4 in the drawing three different embodiments of my invention taking advantage of this relationship, to inversely vary $\phi_M$ and $V_A$ through a single power transmitter means, and for this purpose I have made the free ends of said main and armature circuits 28 and 30 selectively connectible through a common power transmitting means 32 to a plurality of points 34 on said core winding means intermediate the fixed points of connection 22 and 24 to said magnetic core winding means. As shown, this feature is common to all embodiments. In the embodiments shown in Figs. 1-3, the power transmitting means 32 is adjustably connected to said plurality of points 34 on said magnetic core winding means by means of a rider 36 on the end thereof adjustably movable into contact with said magnetic core winding means along said plurality of points. In the embodiment of my invention shown in Fig. 4, contacts 38 are provided, each individually connected to the desired plurality of points or taps 34' along said magnetic core winding means and said adjustable or movable portion of the power transmitting means comprises a movable switch element 36' adjustably movable to the desired one of said contacts 38 and hence taps 34'. Insofar as this feature of my invention is concerned, the adjustable power transmitting means 32 of the embodiment of my invention shown in Figs. 1 and 2 is adjustably connected to the desired points on said magnetic core winding means by means of a rider 36 movable thereover in similar fashion to the rider 36 shown in Fig. 3. In all embodiments of my invention, all of said windings T, M, A and Q are characterized and arranged only in such a predetermined manner as to provide voltages in accordance with predetermined voltage and speed characteristics varying for different speeds as to cause the speed and transformer voltages induced into the coils undergoing commutation to be substantially equal at all speeds on movement of said adjustable power transmitting means. It is apparent, therefore, that said windings must be similarly characterized and arranged as to continuously substantially satisfy said aforesaid two equations.

A further feature of my invention is to provide a motor which may be selectively operated at subsynchronous speeds particularly desirable for use in starting the motor and for certain other purposes. For this purpose I also arrange said main and armature circuits 28 and 30 so that they may also be connectible to said magnetic core winding means T to provide adjustable armature voltages of reverse phase on such selectively connectible connection of said power transmitting means 32. I have shown in the drawing two alternative methods of providing these supplemental selective connections. In the embodiments of my invention shown in Figs. 3 and 4, the point 24 at which the armature winding A is connected to the transformer, is spaced from an end of said core winding means, the core winding means continuing beyond said point as at 40, and said power transmitting means 32 is also adjustably connectible to a plurality of points on said core winding means 40 beyond said fixed point of connection 24 of said armature circuit 30 thereto to automatically provide adjustable armature voltages of reversed phase and adjustable main voltages on such selectively variable connection of said power transmitting means 32 to said magnetic core winding means portion 40 beyond said point 24. It is apparent that with this construction, as the rider 36 is moved along said core winding means beyond said point 24 over the portion 40 thereof, the phase of the armature voltage will automatically become reversed, and both the armature voltage and the main field voltage adjustably varied for satisfactory operation of the motor at subsynchronous speeds. It is thus apparent that this change of phase may be effected by employing an auto transformer of a type known in the art to permit additional operation of the motor at subsynchronous speeds.

I have shown in Figs. 1 and 2 an alternative type of means for selectively operating the motor at sub-synchronous speeds, and for this purpose have shown both the armature and main circuits split, and the portion 42 of the armature circuit 30 permanently connected to the fixed point 24 on said magnetic core winding means. To reverse the phase in the armature circuit, I have employed a standard type of phase reversing double pole double throw switch 44 interposed in said split armature and main circuits having a movable switch element comprising blades 46 selectively connecting for super synchronous speeds in the position thereof shown in Fig. 1 the said main and armature windings 28 and 30 to said power transmitting means 32, in similar manner as in Figs. 3 and 4, to provide said inversely variable voltages in said main and armature windings M and A on the selective variable connections of said power transmitting means 32 to said magnetic core winding means in any of the manners hitherto described, namely, through the medium of the adjustable rider 36 shown in Fig. 3, or the adjustable switch member 36' shown in Fig. 4. As shown in Fig. 2 of the drawing, said phase reversing double pole double throw switch 44 is alternatively connectable in another position thereof for use at sub-synchronous speeds after movement of the movable switch blades 46 thereof. When moved to such position, as shown in Fig. 2, the main winding M is connected through the circuit portion 48 through said switch blades 46 and switch circuit 44 and through said circuit portion 42 to the fixed point 24 to provide a fixed main voltage. With this connection of the switch blades one end of the armature winding A is connected through circuit 48, the movable switch blades 46 and switch circuit 44, and circuit 42 to the field point 24. The other end of the armature is connected through armature circuit 30, switch blades 46, switch circuit 44 and the adjustable power transmitting means 32 to adjustable points 34 on the transformer T to provide an adjustably variable armature voltage in said reversed phase only on such variable connection of the said power transmitting means 32 to the desired selected point 34 on said core winding means.

It is thus apparent that in the position of the switch shown in Fig. 1, the device may operate generally at super synchronous speeds with the desired common output characteristics of the other embodiments and in accordance with said equations. It is also obvious that when the switch is moved to the position shown in Fig. 2, the same motor may be similarly actuated by movement of the same power transmitting means to provide satisfactory operating conditions for sub synchronous speeds particularly desirable in starting the motor.

It is thus obvious that by providing a motor having both a super synchronous speed range and a sub synchronous speed range I have provided a motor operable in a satisfactory manner over a speed range having the peculiarly desirable characteristics at super synchronous speeds.

It is thus apparent that I have provided a simplified structure from that shown in my aforesaid patents of less cost and easier to manufacture having satisfactory output characteristics for most practical uses and employing the principles and advantages set forth above.

It is understood that my invention is not limited to the specific embodiments shown and that various deviations may be made therefrom without departing from the spirit and scope of the appended claims.

What I claim is:

1. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line, a circuit for said quadrature winding and dephasing means connected to two fixed points on said magnetic core winding means, a circuit for said main winding connected to a fixed point on said magnetic core winding means and a circuit for said armature winding connected to a fixed point on said magnetic core winding means, the free ends of said main and armature circuits being selectively connectable through a common power transmitting means to a plurality of points on said core winding means intermediate the fixed points of connection of the other ends thereof to provide inversely variable voltages in said main and armature windings, and means for connecting said main and armature circuits to said magnetic core winding means to provide adjustable armature voltages of reversed phase on such selectively variable connection of said power transmitting means.

2. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line, a circuit for said quadrature winding and dephasing means connected to two fixed points on said magnetic core winding means, a circuit for said main winding connected to a fixed point on said magnetic core winding means, a circuit for said armature winding connected to a fixed point on said magnetic core winding means, the free ends of said main and armature circuits being selectively connectable through a common power transmitting means to a plurality of points on said core winding means intermediate the fixed points of connection of the other ends thereof to provide inversely variable voltages in said main and armature windings, and a phase reversing double pole double throw switch interposed in said main and armature circuits selectively connectable from said main and armature windings to said power transmitting means and said first armature connection.

3. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line at two spaced points, a circuit for said quadrature winding and dephasing means connected to two fixed points on said magnetic core winding means, a circuit for said main winding connected to a fixed point on said magnetic core winding means and a circuit for said armature winding connected to a fixed point on said magnetic core winding means spaced from an end thereof, the free ends of said main and armature circuits being selectively connectable through a common power transmitting means to a plurality of points on said core winding means intermediate the fixed points of connection of the other ends thereof to provide inversely variable voltages in said main and armature windings, said power transmitting means being also adjustably connectable to a plurality of points on said core winding means beyond said fixed point of connection of said armature circuit to provide adjustable armature voltages of reversed phase and adjustable main voltages on such selectively variable connection of said power transmitting means.

4. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line, a circuit for said quadrature winding and dephasing means connected to two fixed points on said magnetic core winding means, a circuit for said main winding connected to a fixed point on said magnetic core winding means and a circuit for said armature winding connected to a fixed point on said magnetic core winding means, the free ends of said main and armature circuits being selectively connectable through a common power transmitting means to a plurality of points on said core winding means intermediate the fixed points of connection of the other ends thereof to provide inversely variable voltages in said main and armature windings.

5. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line, a circuit for said quadrature winding and dephasing means connected to two fixed points on said magnetic core winding means, a circuit for said main winding connected to a fixed point on said magnetic core winding means and a circuit for said armature winding connected to a fixed point on said magnetic core winding means, the free ends of said main and armature circuits being selectively connectable through a common power transmitting means to a plurality of points on said core winding means intermediate the fixed points of connection of the other ends thereof to provide inversely variable voltages in said main and armature windings, said windings being characterized and arranged only in such a predetermined manner as to provide voltages in accordance with predetermined voltage and speed characteristics varying for different speeds as to cause the speed and transformer voltages induced into the coils undergoing commutation to be substantially equal at all speeds on movement of said adjustable power transmitting means.

6. In combination, an alternating current motor comprising a main winding, a rotor having a coiled commutator armature winding, brushes placed substantially along the axis of said main winding, a quadrature winding spaced ninety electrical degrees from the main winding and means for dephasing the current in the quadrature winding; magnetic core means, winding means wound around said core means connectable to a main line, a circuit for said quadrature winding and dephasing means connected to two fixed points on said magnetic core winding means, a circuit for said main winding connected to a fixed point on said magnetic core winding means and a circuit for said armature winding connected to a fixed point on said magnetic core winding means, the free ends of said main and armature circuits being selectively connectable through a common power transmitting means to a plurality of points on said core winding means intermediate the fixed points of connection of the other ends thereof to provide inversely variable voltages in said main and armature windings substantially in accordance with the equations $e_t = e_s$ and $$N = \frac{-I_a Z + K \phi_M f \pm V_A}{K \phi_Q}$$

to provide the desired output characteristics.

AUSTIN S. NORCROSS.